United States Patent
Ananthakrishnan et al.

(10) Patent No.: US 9,641,690 B2
(45) Date of Patent: May 2, 2017

(54) SYSTEMS AND METHODS FOR ROUTING USER DATA

(71) Applicant: Bank of America Corporation, Charlotte, NC (US)

(72) Inventors: Lekha Ananthakrishnan, Charlotte, NC (US); Joseph Timem, Fair Lawn, NJ (US); Russell B. Lewis, Charlotte, NC (US); Jerard D. Lasell, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 404 days.

(21) Appl. No.: 14/054,747

(22) Filed: Oct. 15, 2013

(65) Prior Publication Data

US 2015/0036813 A1  Feb. 5, 2015

Related U.S. Application Data

(60) Provisional application No. 61/861,091, filed on Aug. 1, 2013.

(51) Int. Cl.
*H04M 7/00* (2006.01)
*H04M 5/00* (2006.01)
*H04M 3/00* (2006.01)
*H04M 3/51* (2006.01)

(52) U.S. Cl.
CPC ............ *H04M 7/0027* (2013.01); *H04M 3/51* (2013.01)

(58) Field of Classification Search
CPC ........ H04M 3/51; H04W 12/12; H04W 8/183
USPC ..................................... 379/265.09
See application file for complete search history.

(56) References Cited

U.S. PATENT DOCUMENTS

| | | | |
|---|---|---|---|
| 8,676,895 B1 | 3/2014 | Roy et al. | |
| 8,781,103 B2* | 7/2014 | Baranovsky et al. | ... 379/265.09 |
| 2010/0002685 A1 | 1/2010 | Shaham et al. | |
| 2014/0171034 A1* | 6/2014 | Aleksin et al. | ............ 455/414.1 |
| 2014/0254788 A1* | 9/2014 | Annapareddy et al. | . 379/265.09 |

* cited by examiner

*Primary Examiner* — Nafiz E Hoque
(74) *Attorney, Agent, or Firm* — Weiss & Arons LLP; Michael A. Springs, Esq.

(57) ABSTRACT

Apparatus for initiating a phone call is provided. The apparatus may comprise a receiver configured to receive a request from a user to initiate a phone call. The apparatus may also comprise a transmitter. In response to the receipt of the request to initiate the phone call, the transmitter may be configured to transmit user data over a data communications network to a remote computer platform. The remote computer platform may be in communication with one or more agent desktops.

6 Claims, 8 Drawing Sheets

SYSTEMS AND METHODS FOR ROUTING USER DATA

CROSS-REFERENCE TO RELATED APPLICATION

This application claims the benefit of U.S. Provisional Application No. 61/861,091, filed on Aug. 1, 2013, which is hereby incorporated by reference herein in its entirety.

FIELD OF TECHNOLOGY

Aspects of the disclosure relate to providing apparatus and methods for routing user data. In particular, the disclosure relates to apparatus and methods for routing user data associated with a user-initiated phone call.

BACKGROUND

Many websites are available which provide users with a wide range of services. These websites may be accessed through the internet or through applications downloaded onto a mobile phone, tablet, or other personal computing device. Exemplary websites include websites listing goods or services for sale and mobile banking applications.

A user browsing a website may desire to speak to a customer service representative regarding purchasing a product, navigating a web page or screen, or displayed information. Typically, the user calls a customer service phone number and explains who he is, where he is on the website, and what he is trying to accomplish. These explanations are needed in order for the customer service representative to provide assistance.

It would be desirable, therefore, to provide apparatus and methods for routing both a user call and user-related information to a customer service representative. The user-related information may include the location of the user on the website, the history of the user's activity on the website, and/or other information that may assist the customer service representative in providing assistance to the customer. This is desirable at least because it enables a customer service representative to provide contextual help to the customer and increase the efficiency and speed of the help provided.

Additionally, many websites require a user to sign in and authenticate his identity using one or more usernames, passwords, credit card numbers, security codes or other identifying information. When an authenticated user desires to call customer service, a customer service representative typically requires him to re-authenticate his identity prior to providing assistance.

It would be desirable, therefore, to provide apparatus and methods for enabling cross-channel authorization between an internet website and a calling center. The cross-channel authorization may enable an authenticated website user to speak to a customer service representative without having to re-authenticate his identity. Furthermore, the cross-channel authorization may transmit user data to the call service representative, enabling the representative to provide the user with contextual help.

SUMMARY OF THE DISCLOSURE

Systems and methods are provided for initiating a pre-authorized phone call. The systems and methods may include apparatus comprising a mobile application platform and a computer telephony integration platform ("CTI"). The mobile application platform may include a receiver configured to receive a request to contact a customer service representative. The mobile application platform may also include a transmitter. In response to the receipt of the request, the transmitter may be configured to transmit customer metadata to the CTI.

The CTI platform may include a receiver configured to receive the customer metadata from the mobile application platform. The CTI platform may also include a processor configured to select an access number based at least in part on the received customer metadata. The processor may also be configured to generate an access code and an expiry time. The CTI platform may further include a transmitter configured to transmit the access number, the access code and the expiry time to the mobile application platform.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
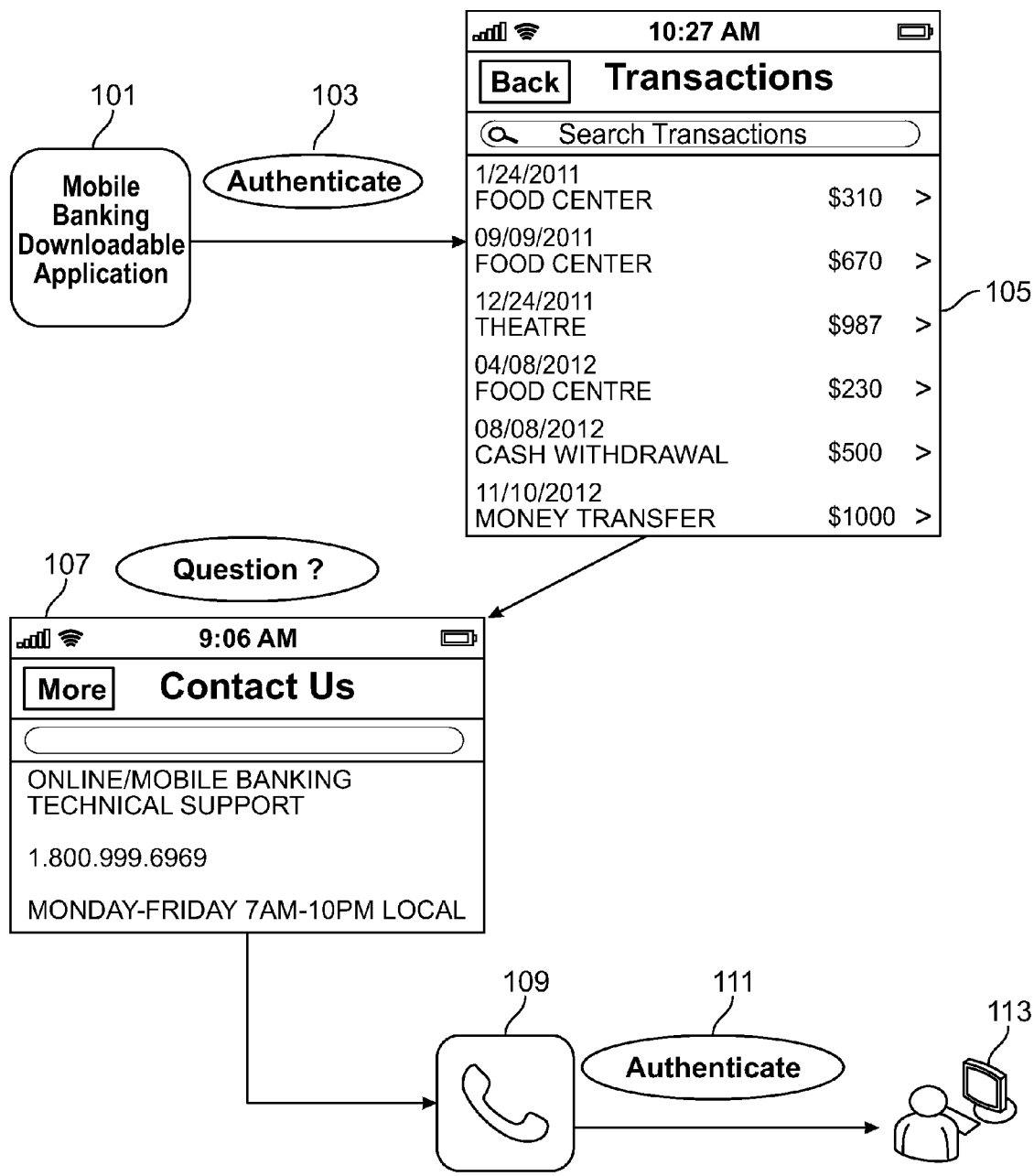
FIG. 1 shows a prior art process.

Apparatus and methods for routing a phone call and information associated with the phone call are provided. The apparatus and methods may be implemented on any suitable hardware device, such as a mobile phone, tablet, personal computer, television, or any other apparatus that supports a connection to one or more communication networks such as the internet or a telephony network.

The apparatus and methods of the invention may connect a user of a webpage, application, mobile application, or web-based application to a customer representative. The apparatus and methods of the invention may also transmit customer metadata to the customer representative. The customer metadata may include information relating to the customer's identity, authenticated status, activity on one or more web pages or screens, one or more reasons for the call, and/or other suitable information.

As a result, the invention may assist in providing a user of a webpage, mobile application, or web-based application with contextual help from a customer representative. Additionally, the invention may do away with at least a portion of the customer representative's requirement to authenticate the user. This may result in increased customer satisfaction, increased efficiency and lower processing costs.

In some embodiments, the invention may also be used to provide contextual help to a user. For example, the invention may be used to provide contextual help to customer service representatives that are in contact with a user via phone, text messaging, live chat (such as instant messaging or video chat), or any other communication that may benefit from the knowledge of a user's authentication and/or session state data.

The invention may be integrated into one or more web pages, applications downloaded onto a mobile phone, tablets, televisions, or on any other suitable hardware. For the purposes of the application, the invention may be referred to as being incorporated into a mobile downloadable application (hereinafter, "MDA"). However, this is for exemplary purposes only and not limiting in any way. Exemplary MDAs include MDAs used for mobile banking, to purchase goods or services, view and edit personal information, advertise, and initiate or confirm transactions such as real-estate transactions and financial transactions.

A user of an MDA in accordance with the invention may authenticate his identity in the MDA using one or more usernames, passwords, bank account numbers, credit card numbers, biometric information, and/or any other suitable information. The authentication may be optional or required.

After authentication of his/her identity, the user may select to view one or more screens in the MDA. The user may subsequently encounter a difficulty while using the MDA, or have a question regarding one or more pieces of displayed information. For example, in the embodiments in which the MDA is a mobile banking application, the customer may have a question relating to a displayed deposit amount, a disputed transaction, a desired transaction that is not working, etc. The customer may subsequently desire to speak to a customer representative.

The MDA may display a selectable option that, when selected, connects the user with a customer service representative. The selectable option may include text such as 'Call Customer Service,' 'Call Bank,' 'Call Store,' 'Get Help,' 'Click to Call,' 'Click to Dial,' 'Let's Talk' or any other suitable phrase. The selectable option may alternately, or additionally, include one or more icons, such as a telephone or a confused user. In other embodiments, the selectable option may be included in a drop-down menu.

For the purposes of the application, the selectable option may be referred to alternately herein as the 'Get Help' icon. The Get Help icon may be selected using a touch screen, a mouse, or any other suitable method.

The Get Help icon may be displayed on one or more screens included in the MDA. The Get Help icon may be displayed in one or more locations on a screen included in the MDA.

In the embodiments in which the MDA is a mobile banking MDA, the Get Help icon may be displayed on a screen that displays deposit account details and/or transaction details. In some embodiments, the Get Help icon may be displayed in close proximity to two or more deposit account details and/or transaction details displayed on a screen.

The MDA may support selective presentation of the Get Help icon. The selective presentation may be based on one or more business rules. The business rules may be based on real time. For example, the Get Help icon may be displayed only during the business hours of one or more customer help centers and/or when agent(s) are available to take the call. During non-business hours, the Get Help icon may be disabled, and a corresponding message may be displayed on the screen. The message may state that the Get Help function is unavailable at this time.

The MDA may include a mechanism, such as a 'chicken switch' capability, that may enable the MDA to turn off the calling capabilities described herein. The MDA may turn off the calling capabilities based on technology failures or on the receipt of one or more commands.

In some embodiments, the Get Help icon may be displayed to a user only after the user has authenticated his identity to the MDA. In some of these embodiments, the selection of the Get Help icon may initiate a transmission of data from an authenticated space.

A user may select the Get Help icon. After the selection of the Get Help icon, the MDA may route metadata to a computer telephony integration platform ("CTI"). In some embodiments, the MDA may route the metadata substantially immediately after the selection of the Get Help icon. In some embodiments, the MDA may route the metadata after the lapse of a predetermined time period.

In some embodiments, the MDA may transmit with the metadata a request to initiate a call session with a call center representative. In some embodiments, the transmission of the metadata may be interpreted by the CTI as a request to initiate a call session with a call center representative.

The metadata transmitted by the MDA to the CTI may be referred to alternately herein as 'user session-state metadata,' 'customer-specific data,' 'customer data', 'user data,' 'customer metadata' and/or 'user metadata.' In some embodiments, the initiation of the metadata routing may be automatically initiated in response to the selection of the Get Help icon. In some of these embodiments, the initiation of the metadata routing may be without receiving an electronic request for data from the CTI and/or any other application different from the MDA. In some embodiments, the metadata may be text-formatted.

In some embodiments, the MDA may route the metadata to the CTI using one or more secure transmission networks. For example, in the embodiments in which the MDA is an online banking application, the data may be routed through the bank's internal routing system to the CTI. In other embodiments, the MDA may use less secure or public transmission networks to route the metadata.

The CTI may include one or more applications that integrate or coordinate interactions on a computer and telephone. The CTI may be run on a desktop, laptop, and/or through one or more servers. Exemplary server functions that may be executed by the CTI include call reporting, call routing, mobile call integration, voice recognition integration ("VRI"), call bridging, interaction tracking and messaging.

In some embodiments, the CTI may be in electronic communication with a call center platform. In some embodiments, the CTI may support some or all of a call center platform's functionalities. The CTI may be referred to alternately herein as a 'remote call center platform.'

In the event that the data transmission from the MDA to the CTI fails to be transmitted or processed due to a technical failure, the call may be automatically disconnected. In some embodiments, a corresponding message may be displayed on the screen.

In the event that the CTI receives the MDA's data transfer, the CTI may, in response to the receipt of the metadata, assign a toll or toll-free access number to the MDA, referred to alternately herein as an 'access number.' The access number may be a phone number of a call center.

In response to the receipt of the metadata from the MDA, the CTI may additionally or alternately generate an access code and/or an expiry time. In some embodiments, the expiry time may be associated with the access code. The access code may be a code that uniquely identifies the MDA and/or its user to the CTI. Exemplary expiry times generated by the CTI include five seconds, ten seconds, twenty seconds, thirty seconds, one minute, and any other suitable time interval.

The CTI may transmit one or more of the access number, the access code and the expiration time, in addition to any other suitable data, back to the MDA. The data may be transmitted substantially immediately after the generation of the access number, the access code and/or the expiration time, or after the lapse of a predetermined time period.

In some embodiments, the CTI may also transmit an estimated waiting time ("EWT") to the MDA. The MDA may handle the EWT in any suitable fashion as known to those skilled in the art. Exemplary handling of the EWT by the MDA is as follows:
  I. If the EWT is less than X, do not display EWT and proceed with calling the access number;
  II. If EWT is between X and Y, display actual EWT prior to placing the call, and provide a selectable option on the screen that, when selected, identifies whether the customer desires to continue;
  III. If EWT is between Y and Z, display: 'EWT is greater than Y' prior to placing the call, and provide a selectable option on the screen that when selected, identifies whether the customer desires to continue; and
  IV. If EWT is greater than Z, determine that the call function is not available. Display on the screen a corresponding message that the call function is not available.

X, Y and Z may be threshold EWT times.

In some embodiments, in response to the receipt of the metadata from the MDA, CTI may also reserve an agent associated with the access number to handle the call. In some embodiments, the CTI may reserve an agent by opening a live session at the agent's desk top, prepping the agent for the receipt of the call. The agent may be reserved for a specified time frame. For example, the agent may be reserved until the access code expires. In other embodiments, the agent may be reserved when a phone call from the MDA is received and/or validated.

The agent may be reserved by transmitting an electronic message to the agent's graphical user interface ("GUI"). The message may inform the agent that a customer is attempting to initiate a call. The live session may include displaying on the agent's GUI at least a portion of the metadata transmitted to the CTI from the MDA.

Metadata routed to the CTI may include customer authentication data. Customer authentication data may include a customer's authentication status in the MDA. For example, the authentication data may include whether or not the customer has been successfully authenticated in the MDA. The authentication data may also include how the customer authenticated himself to the MDA, such as authentication via username, password, account number, e-mail address and/or security question(s). The authentication data may further include a number of attempts that were made to authenticate prior to authentication. In some embodiments, the authentication data may also include one or more pieces of data input by the customer to authenticate his identity to the MDA.

Customer authentication data may also include an access level of a customer. In the embodiments in which the MDA is a mobile banking MDA, exemplary access levels may include function(s) that are available to a user on one or more accounts. For example, a son or daughter of a primary account holder, or different employees of a small business, may have limited access levels relative to the primary account holder. Limited access levels may include authorization to execute transactions under a certain amount of money and/or authorization to execute only account deposits.

Metadata routed to the CTI may also include customer identifying information. Exemplary customer identifying information includes a customer's name, age, address, a unique customer identifier, one or more customer bank account numbers, a type of hardware device that the customer is currently using, a customer mobile phone number, current customer geographical location and/or any other suitable data. The current customer geographical location may be pulled from a GPS application located on the customer's mobile phone, tablet, or personal computer.

Metadata routed to the CTI may additionally include session-state metadata. Exemplary session-state metadata may include page-level metadata, such as a reference to a current location of the customer in the MDA by name or page number, and/or a snapshot of at least a portion of the MDA that the customer was viewing prior to selecting the Get Help icon.

In exemplary embodiments, session-state metadata transmitted by the MDA to the CTI may include an account number that the customer was viewing prior to selecting the Get Help icon. Additional exemplary session-state metadata may include one or more transactions that the customer was attempting to engage in prior to selecting the Get Help icon. Additionally, session-state metadata may include a snapshot or video of customer navigation in the MDA prior to selecting the selectable icon. The customer navigation may relate to customer action in the MDA during a predetermined time period prior to selecting the selectable icon. Exemplary time periods include ten to twenty seconds, thirty seconds, or a minute long snapshot or video. In some embodiments, the snapshot or video may be played at twice the speed of the actual customer navigation, three times the speed, or at any other speed faster or slower than the actual customer navigation.

Metadata routed to the CTI may also include product data. The product data may relate to a product that the customer was viewing prior to selecting the Get Help icon. For example, the product data may include a transaction identifier of a transaction that the customer was viewing prior to selecting the Get Help icon. In some embodiments, the product data may include one or more products that the customer viewed since he authenticated himself in the MDA. In some embodiments, the product data may include products that the customer viewed during a predetermined time period prior to selecting the Get Help icon.

Metadata routed to the CTI may further include merchant level metadata. For example, merchant level metadata may include merchant details of one or more merchant(s) that executed a debit or credit transaction on behalf of the customer. An exemplary transaction that pertains to a merchant may include a transaction executed at or by the merchant. The merchant level metadata may include a merchant identifier and other suitable merchant information.

In some embodiments, the MDA may map one or more pieces of customer metadata to an existing system of tagged data. For example, some call centers use caller intent IVR tags to identify pieces of information. The IVR tags are sometimes displayed on an agent's desktop. After the selection of the Get Help icon, the MDA may pull customer metadata to be transmitted to the CTI. The MDA may then map at least some of the data onto one or more caller intent IVR tags. For example, mobile screen data displayed to a customer prior to selecting the Get Help icon may be used to generate one or more IVR tags that are subsequently transmitted to the CTI. It should be noted that, in other embodiments, the CTI may receive customer specific data from the MDA and subsequently use at least a portion of the data to generate one or more IVR tags.

In some embodiments, the CTI may use at least a portion of the metadata to select an appropriate access number, call center and an appropriate agent to take the call. For example, in some embodiments, the CTI may use page-level metadata to determine an appropriate agent to take the call. In a further example, if the transaction at issue is a credit card transaction, the CTI may route the call to a credit card agent. After selecting the appropriate agent to take the call, the CTI may transmit one or more of the selected access number, the access code and the expiry time, to the MDA.

After the receipt of the access number, the access code and/or the expiry time from the CTI, the MDA may, in some embodiments, automatically dial the access number. The MDA may automatically dial the access number by transmitting a request to a mobile dialer function application to call the access number.

After dialing the access number, the MDA may pass the access code to a receiver through dual-tone multi-frequency signaling ("DTMF") using the customer's mobile phone dialer function. The automatic dialing of the access number and the passing of the access code may occur substantially simultaneously, or there may be a time lapse between the automatic dialing of the access number and the passing of the access code.

After initiation of the phone call, the MDA may display on a screen text and/or an icon informing the customer that he/she is being automatically connected to a call center agent. The text may also inform the customer that his information will be securely transmitted to the call center agent, and, in some embodiments, that re-authentication may not be required.

In other embodiments, upon receipt of the access number and the access code from the CTI, an MDA may display the access number and the access code to the customer. The customer may then call the access number using his mobile phone calling application or, in some embodiments, any desired phone service. After calling the access number, the customer may input his access code after hearing an auditory prompt requesting the input of his access code. In some embodiments, the CTI may use interactive voice recognition ("IVR") technology to receive the access code from the customer. In some embodiments, the CTI may receive the access code from the customer by the customer manually inputting the access code into a keypad or keyboard.

It should be noted that, in the event that an incorrect access number is called, either automatically or by the customer himself/herself, the MDA may automatically disconnect the call and display a corresponding message on the screen. For example, if a customer redials from a call history, the MDA may display on a screen a 'not valid/available' message and disconnect from the call.

After the CTI has received the call and the access code, the CTI may execute one or more steps to authenticate the call.

In some embodiments, when the access number is dialed, the CTI may match the access number with an access number generated initially by the CTI and transmitted to the MDA. The CTI may subsequently match the access code from the incoming call with an access code generated by the CTI and transmitted to the MDA. The CTI may then check if the call was made within the expiry time generated by the CTI. In the event that the access numbers and the access codes match, and the call was made within the expiry time, the CTI may determine that the incoming call has been authenticated. The CTI may subsequently route the phone call to a call center headset used by an agent in a call center.

In some embodiments, the CTI may retrieve an expiry time associated with the access code and/or the incoming phone number and, in some embodiments, a phone number associated with the access code. In the event that the incoming phone number matches the phone number associated with the access code, and/or that the call and/or the access code was received within the set expiry time, the CTI may determine that the incoming call has been authenticated. The CTI may subsequently route the phone call to a call center headset used by an agent in a call center.

In some embodiments, the CTI transmit to an agent computer or agent desktop one or more pieces of customer-specific data substantially simultaneously, or synchronously, with the routing of the phone call. In other embodiments, the CTI may transmit customer data to the agent desktop prior to routing the call to the agent. It should be noted that, in the event that the call gets dropped or disconnected, the CTI may not pass customer-specific data to the agent desktop.

The agent desktop may display on a GUI some or all of the customer-specific data transmitted to the CTI from the MDA. For example, the agent may be informed of one or more of the customer's identity, authentication status, current location in the MDA, and historical usage of the MDA prior to talking to the customer. This may assist the agent to better gauge the customer's intent, address the customer's questions sooner, and give the customer contextual help relating to the customer's question prior to the customer explaining the reason for his call. This may additionally create a more human relationship between the agent and the customer, strengthening customer loyalty and enhancing customer experience.

Furthermore, the agent desktop may display on the GUI customer authentication data. The customer authentication data may include any of the metadata detailed above. For example, the GUI may include a visual indicator indicating whether or not the customer has been successfully authenticated, and if so, how. As a result, the customer may initiate a conversation with the agent without having to go through the steps of authenticating his identity. The GUI may also include an indicator of the access level of the customer.

The customer authentication data received by the agent desktop may be accepted as an authenticator in the agent desktop. The agent desktop may display on the GUI a visual indicator signifying that the customer is authenticated from a mobile channel. For example, the words 'Full Access—Mobile' may be displayed.

In some embodiments, the access level of the customer may be used to establish the authentication level of the customer during the calling session.

In some embodiments, a customer may be required to re-authenticate his identity in the event that he desire to execute one or more transactions characterized as ultra-high risk transactions. For example, in some embodiments, an ultra-high risk transaction may be designated by a financial institution to be any balance transfer. Alternately, the financial institution may designate all transactions over $10,000 as ultra-high risk. In yet a further example, the financial institution may designate all transactions initiated outside the United States as ultra-high risk.

In other embodiments, the ultra-high risk transaction may be designated by the customer. For example, the customer may designate all credit card transactions as ultra-high risk. In yet other embodiments, the ultra-high risk transaction may be customized by the customer. For example, the customer may categorize transactions as ultra-high risk based on geographic location, amount, type or any suitable category or combinations of categories. In some embodiments, the customer may use an online banking application or website to categorize one or more transactions as ultra-high risk transactions.

The agent desktop may restrict access to, or initiation of, ultra-high risk transactions, and include visual indicators specifying the need for additional authorization prior to initiating these transactions.

The agent desktop may also display information selected by the CTI based on the data received from the MDA. For example, if the MDA transmitted to the CTI the current location of the customer, the CTI may display on the agent desktop exemplary services that are available in the area surrounding the customer that may be of assistance. In the embodiments in which the MDA is an online banking application, the CTI may display on the agent desktop some or all of the banking services located within a predetermined radius of the customer's current geographic location.

In some embodiments, upon completion of the call, the customer may be returned to the MDA. The customer may still be authenticated in his MDA, and may be able to continue using his MDA without re-authenticating his identity.

It should be noted that, in the event that the agent desktop fails to receive customer-specific data from the MDA, the CTI may transmit the call to IVR for re-authentication prior to receiving caller assistance.

It should additionally be noted that, in some embodiments, a user may not be authenticated when selecting the Get Help icon. Instead, the user may select the Get Help icon without having been authenticated to the system. In some of these embodiments, the Get Help icon may be displayed to users who have not authenticated their identity to the MDA. In some of these embodiments, one or more pieces of metadata detailed above may be transferred to a customer representative. The user may then be provided with contextual help from a customer service representative. In some embodiments, the customer service representative may ask the user to authenticate his identity prior to, or during the call.

In some of the embodiments in which the user is using an electronic device such as a personal computer that does not have a direct connection to a phone transmission medium, the phone call may be executed as follows. The user may enter his phone number into the webpage, and the phone number may then be sent to a server. The server may use bridging logic to connect the user with the caller representative. For example, the server may place two phone calls, one to the user's phone and the other to the call center agent. The server may then connect them both. Data transfer as detailed above may be transmitted by the webpage to a CTI and displayed on the caller center agent's desktop.

The CTI may log all events relating to calls delivered in accordance with the invention. The CTI may also capture metadata being transferred to agent desktop for reporting purposes. In some embodiments, the CTI may also be configured to provide one or more reporting capabilities. For example, the CTI may log an average handle time for mobile authenticated calls.

The MDA may also be configured to provide one or more reporting capabilities. For example, the MDA may store in one or more databases the following information: when a user indicates intent to call an agent using the 'Get Help' icon, a screen at which the customer initiated the call, the EWT at the time the customer selected the 'Get Help' icon, when the customer selected to wait in the threshold times X-Y and Y-Z, the EWT displayed to a customer and the actual wait time the customer experienced, when the customer disconnected prior to speaking to an agent, and/or when a call fails.

FIG. 1 shows a process associated with the prior art. In the process associated with the prior art, a customer selects a mobile banking downloadable application on his mobile phone at step 101. At step 103, the customer authenticates his identity. At step 105, the customer views transactions for a customer account. The customer may subsequently desire to speak to a call representative regarding a specific transaction or item within the mobile banking downloadable application.

The customer then views call center contact information at step 107. The customer calls the contact number included in the call center contact information at step 109. A customer representative at the call center requires the customer to re-authenticate his identity at step 111. This authentication is the second authentication that the customer had to go through since he accessed his mobile banking downloadable application. After the customer has been authenticated via a call routing application or an agent, the customer then proceeds to explain to the agent the details of his question or inquiry purpose for his call at step 113.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 2A:
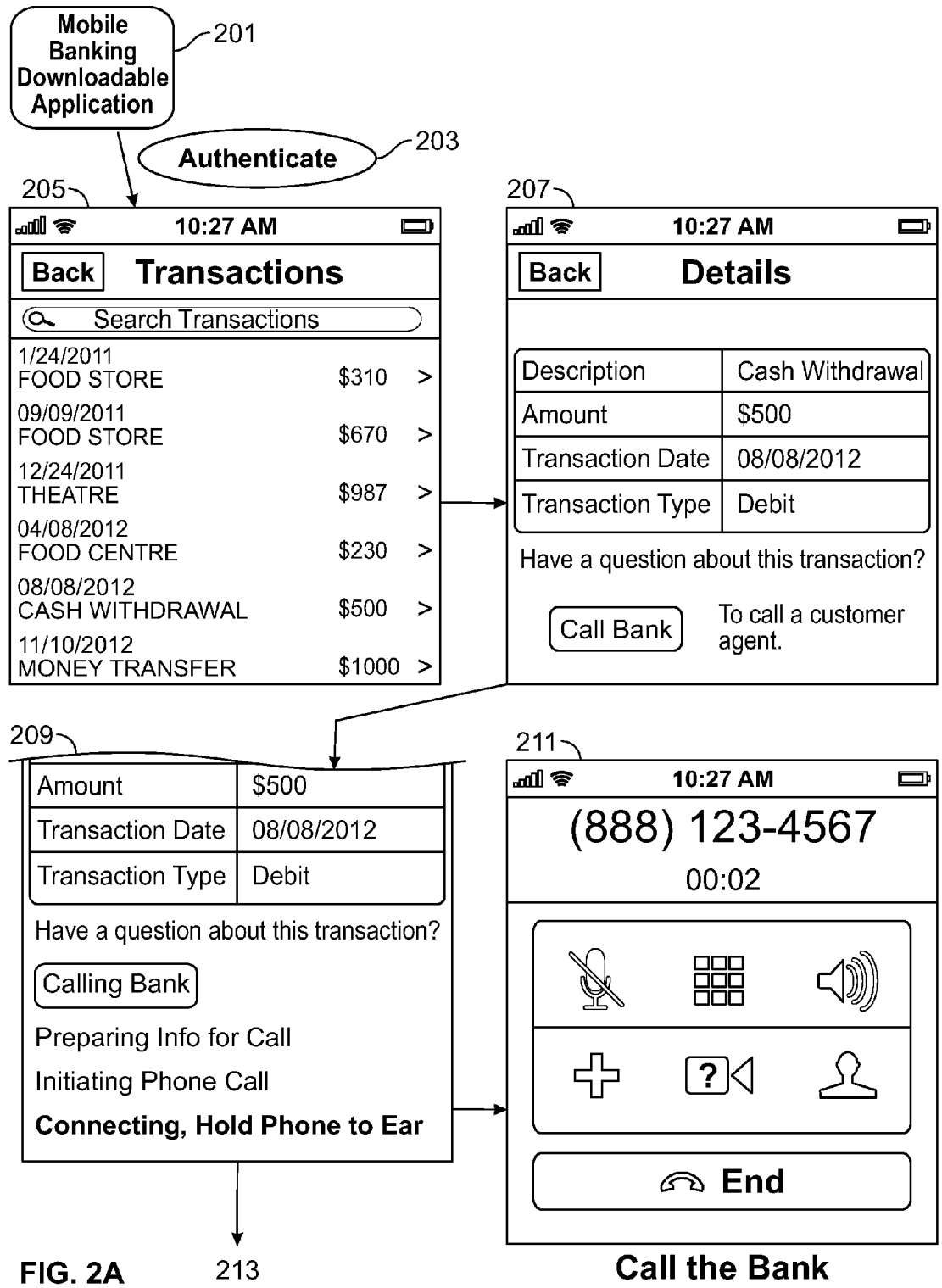
FIG. 2A shows a process in accordance with the invention.
Figure 2B:
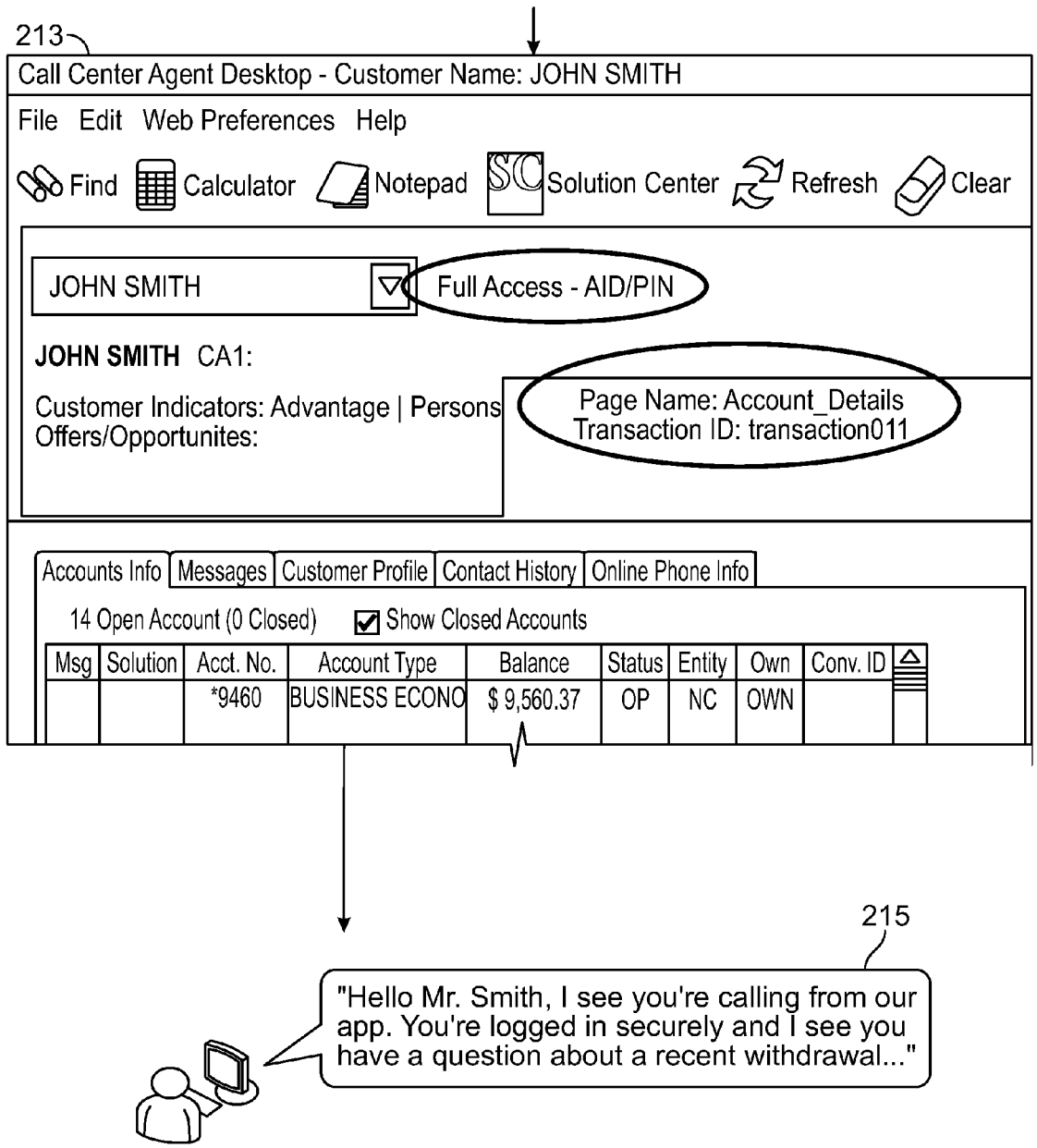
FIG. 2B shows another process in accordance with the invention.

FIGS. 2A and 2B illustrate an exemplary process that may be used in accordance with the systems and methods of the invention. It should be noted that the exemplary process illustrated in FIGS. 2A and 2B are for illustrative purposes only. Each of the steps included in FIGS. 2A and 2B are optional, and may be deleted, modified, and/or generated in an order different from the order illustrated. Furthermore, one or more steps not illustrated in FIGS. 2A and 2B, but described herein, may be added to the process detailed in FIGS. 2A and 2B.

Additionally, it should be noted that each of the steps included in FIGS. 2A and 2B may be executed by one or more receivers, transmitters, processors, and/or any other suitable hardware.

FIGS. 2A and 2B illustrate a flow diagram of an exemplary process that may be used in accordance with the systems and methods of the invention. The illustrative process detailed in FIGS. 2A and 2B may include one or more of steps 202-215.

FIGS. 2A and 2B show a process in accordance with the invention. In FIG. 2A, a customer selects to enter a mobile banking downloadable application at step 201. At step 203, the customer authenticates his identity with the mobile banking downloadable application. At step 205, the customer views transaction data for one of his/her customer accounts. At step 207, the customer selects a specific transaction and views further details regarding the transaction. It should be noted that the screen associated with step 207 includes a 'Call Bank' icon. The Call Bank icon is an icon that, when selected, initiates a data transfer and a phone call in accordance with the invention as described herein.

At step 209, the customer selects the Call Bank icon. The selection of the Call Bank icon may trigger metadata to be transferred to a CTI in accordance with the invention. After receipt of at least a portion of the metadata, the CTI may transmit an access number, access code and/or an expiry time to the mobile device. Upon receipt of at least a portion of the data from the CTI, the mobile device may proceed to call the access number.

At step 211, the mobile device initiates a call to the access number received from the CTI. At step 213, which in some embodiments may occur substantially simultaneously with step 211, an agent desktop displays customer-specific information to the agent. The customer specific information may be information routed to the CTI from the mobile banking downloadable application after the selection of the Call Bank icon.

Customer specific information displayed to the agent on the agent desktop includes the customer's name 'John Smith,' the access level of the customer (Full Access') and the page Account_Details that the customer was viewing when he selected the Call Bank icon. The agent desktop also displays an indicator specifying which transaction the customer was viewing when he selected the Bank Icon. In FIG. 2B, the agent desktop identifies the transaction as having a transaction ID of transaction011.

Additionally, the agent desktop includes a plurality of tabs identifying additional customer specific information. Tabs displayed include Accounts Info, Messages, Customer Profile, Contact History, and Online Phone Information.

At step 215, the agent proceeds to start the call with the customer by referencing the customer specific data displayed on his agent desktop. Thus, the invention has provided systems and methods for giving contextual help to a customer based on the customer's usage of an electronic device prior to initiating the call. Additionally, the invention has preferably removed the need for the agent to re-authenticate the customer's identity. This is at least because the customer authentication data input into the mobile banking downloadable application has been securely transmitted to the agent's desktop in a secure fashion and is used by the CTI as acceptable customer identification.

As will be appreciated by one of skill in the art upon reading the following disclosure, the MDA, the CTI and the agent desktop may be embodied as a method, a data processing system, or a computer program product. Accordingly, the MDA, the CTI and/or the agent desktop may take the form of an entirely hardware embodiment, an entirely software embodiment or an embodiment combining software and hardware aspects.

Furthermore, the MDA, the CTI and/or the agent desktop may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, the MDA, the CTI and/or the agent desktop may be embodied at least partially in hardware and include one or more databases, receivers, transmitters, processors, modules including hardware and/or any other suitable hardware. Furthermore, operations executed by the MDA, the CTI and/or the agent desktop may be performed by the one or more databases, receivers, transmitters, processors and/or modules including hardware.

Figure 3:
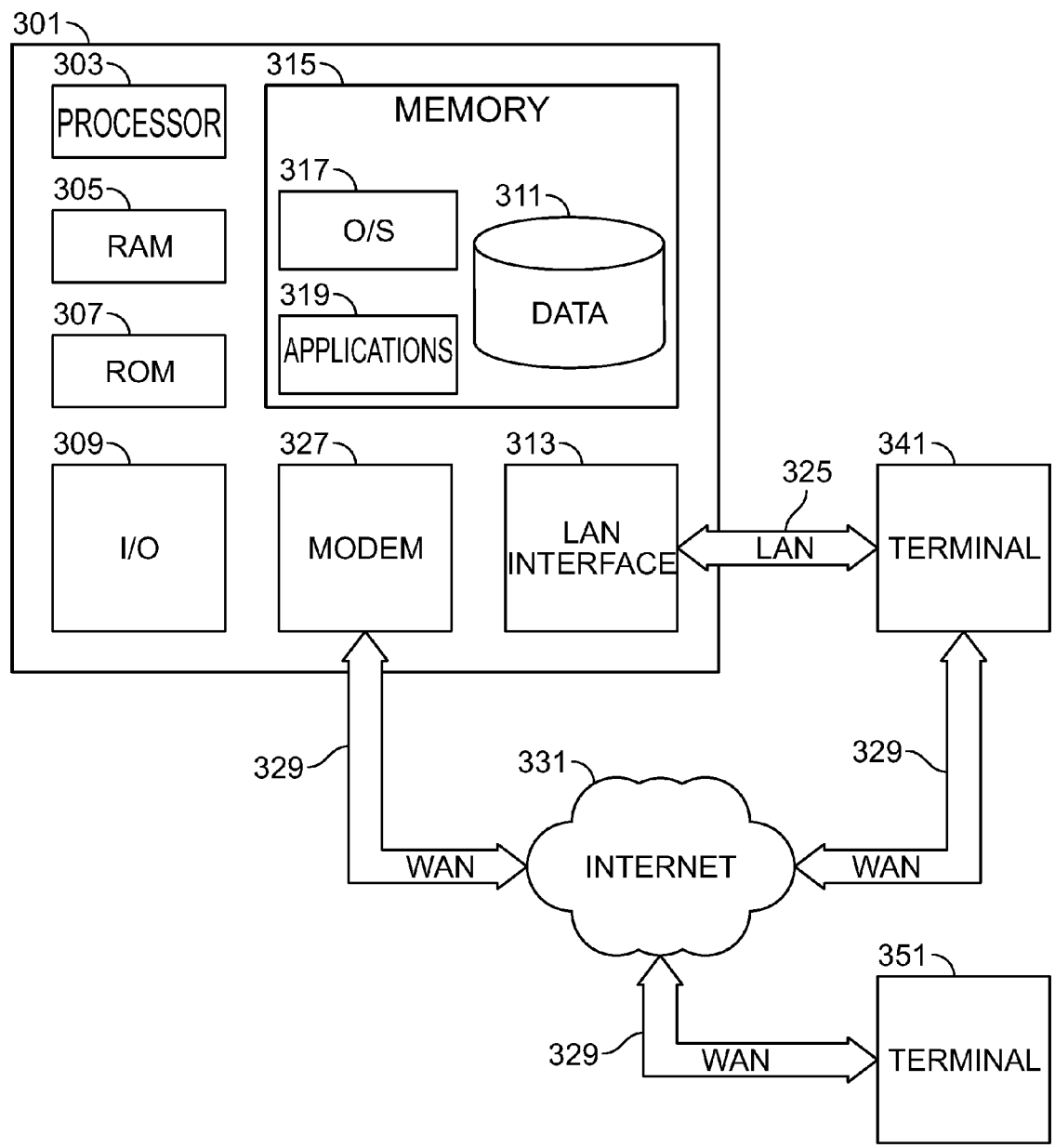
FIG. 3 shows apparatus in accordance with the invention.

FIG. 3 is a block diagram that illustrates a generic computing device 301 (alternately referred to herein as a "server") that may be used according to an illustrative embodiment of the invention. The computer server 301 may have a processor 303 for controlling overall operation of the server and its associated components, including RAM 305, ROM 307, input/output module 309, and memory 315.

Input/output ("I/O") module 309 may include a microphone, keypad, touch screen, and/or stylus through which a user of server 301 may provide input, and may also include one or more of a speaker for providing audio output and a video display device for providing textual, audiovisual and/or graphical output. Software may be stored within memory 315 and/or storage to provide instructions to processor 303 for enabling server 301 to perform various functions. For example, memory 315 may store software used by server 301, such as an operating system 317, application programs 319, and an associated database 311. Alternately, some or all of server 301 computer executable instructions may be embodied in hardware or firmware (not shown). As described in detail below, database 311 may provide storage for information input into the MDA, the CTI and/or the agent desktop.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 313. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages or screens via the World Wide Web from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown).

A terminal such as 341 or 351 may be used by a user of the MDA, the CTI and/or the agent desktop to access and input information into the MDA, the CTI and/or the agent desktop. Information input into the MDA, the CTI and/or the agent desktop may be stored in memory 315. In some embodiments, information input into the MDA, the CTI and/or the agent desktop may be stored in memory 315. The input information may be processed by an application such as one of applications 319.

Figure 4:
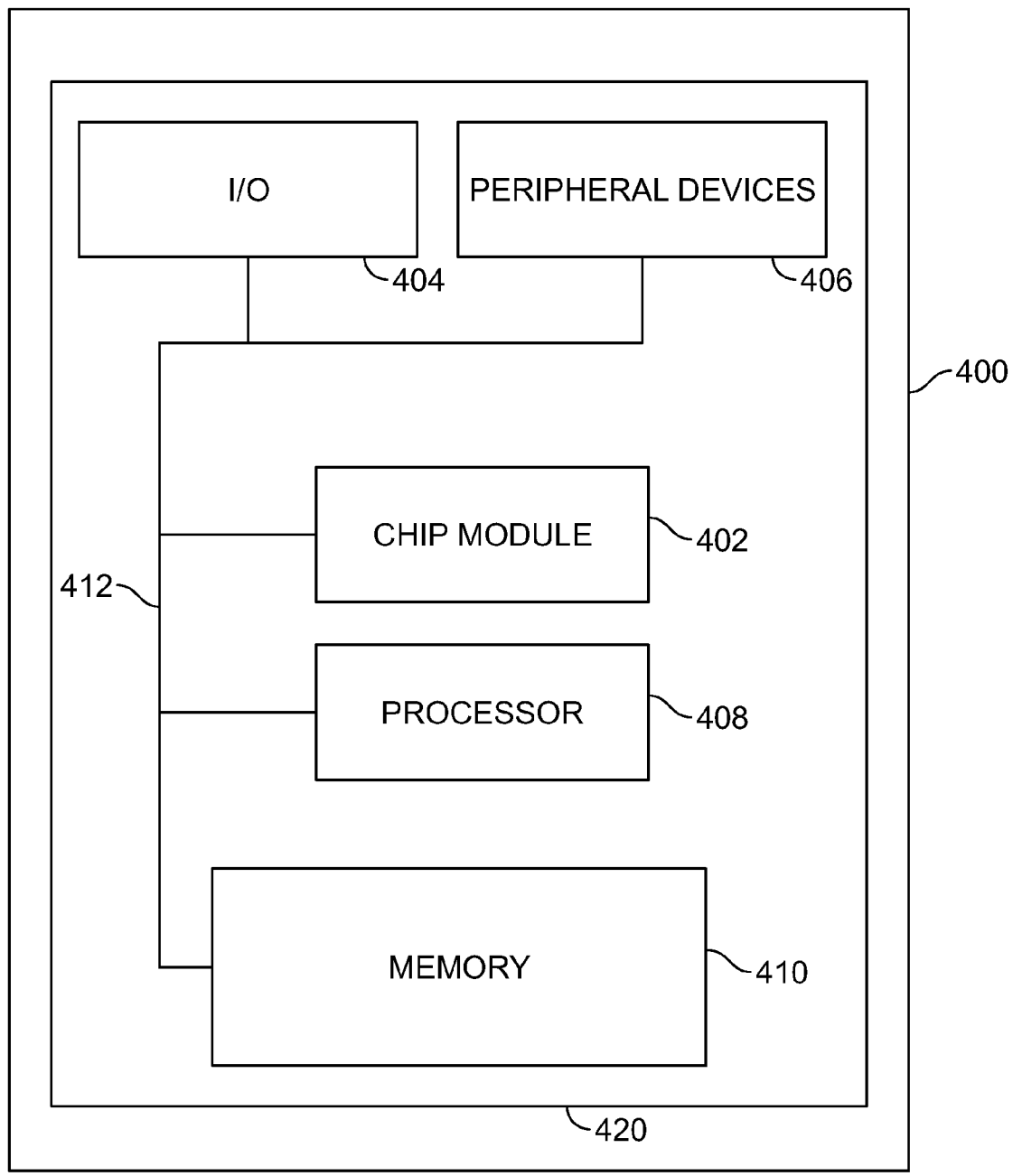
FIG. 4 shows additional apparatus in accordance with the invention.

FIG. 4 shows an illustrative apparatus that may be configured in accordance with the principles of the invention.

FIG. 4 shows illustrative apparatus 400. Apparatus 400 may be a computing machine. Apparatus 400 may be included in apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include the transmitter device and the receiver device and may interface with fiber optic cable, coaxial cable, telephone lines, wireless devices, PHY layer hardware, a keypad/display control device or any other suitable encoded media or devices; peripheral devices 406, which may include counter timers, real-time timers, power-on reset generators or any other suitable peripheral devices; logical processing device ("processor") 408, which may compute data structural information, structural parameters of the data, quantify indicies; and machine-readable memory 410.

Machine-readable memory 410 may be configured to store in machine-readable data structures: data lineage information; data lineage, technical data elements; data elements; business elements; identifiers; associations; relationships; and any other suitable information or data structures.

Components 402, 404, 406, 408 and 410 may be coupled together by a system bus or other interconnections 412 and may be present on one or more circuit boards such as 420. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 400 may operate in a networked environment supporting connections to one or more remote computers via a local area network (LAN), a wide area network (WAN), or other suitable networks. When used in a LAN networking environment, apparatus 400 may be connected to the LAN through a network interface or adapter in I/O circuitry 404. When used in a WAN networking environment, apparatus 400 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 408, for example over the Internet.

Apparatus 400 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Figure 5:
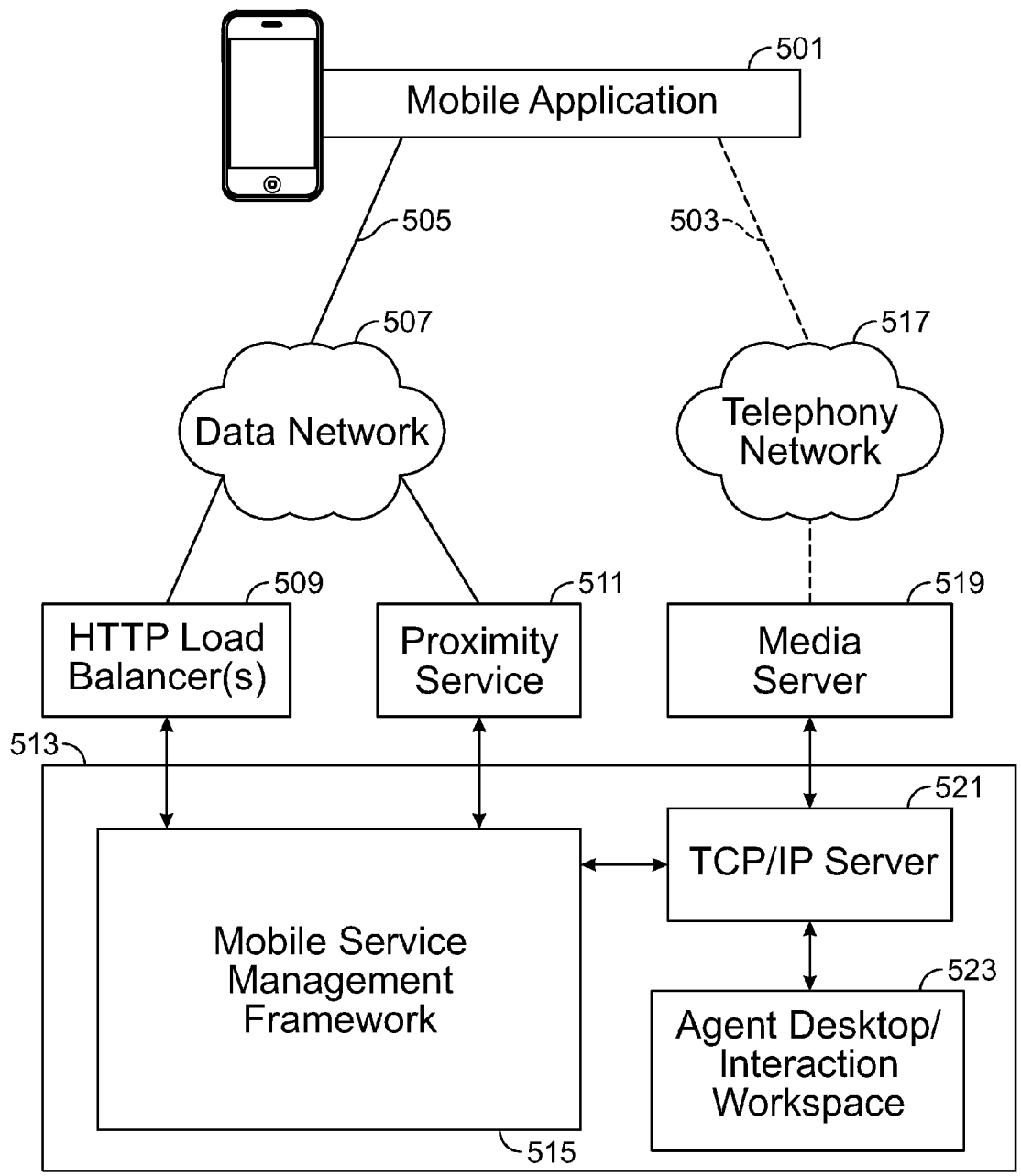
FIG. 5 shows additional apparatus in accordance with the invention.

FIG. 5 shows additional apparatus in accordance with the invention. FIG. 5 includes mobile application 501. Mobile application 501 may be included in a mobile device. FIG. 5 additionally includes data network 507 and telephony network 517. Communications over data network 507 are represented using lines such as line 505. Communications over telephony network 503 are represented using lines such as line 503.

Mobile application 501 may be in communication with one or more of data network 507 and telephony network 517. Mobile application 501 may transmit data over data network 507 to hyper text transfer protocol (HTTP) load balancer(s) 509 and/or proximity service 511. One or more of HTTP load balancer(s) 509 and/or proximity service 511 may be in communication with CTI platform 513. CTI platform 513 may represent at least a portion of a call center platform. In some embodiments, one or more of HTTP load balancer(s) 509 and/or proximity service 511 may be in communication with mobile service management framework 515.

Mobile service management framework 515 may include an orchestration server. The orchestration server may include a logic integration platform that creates and/or maintains customer service applications. Mobile service management framework 515 may also include one or more management and/or reporting functionalities.

Mobile application 501 may transmit data over telephony network 517 to media server 519. Media server 519 may be in communication with Transmission Control Protocol/Internet Protocol ("TCP/IP") server 521. In some embodiments, TCP/IP server 521 may use TCP/IP protocol to initiate one or more agent desktop session. TCP/IP server 521 may also support one or more video conferences, voice conferences and/or media streams.

TCP/IP server 521 may interface with mobile service management framework 515 and/or agent desktop interaction workspace 523. Agent desktop interaction workspace 523 may include communication and routing protocol for routing calls to agent desktops.

Figure 6:
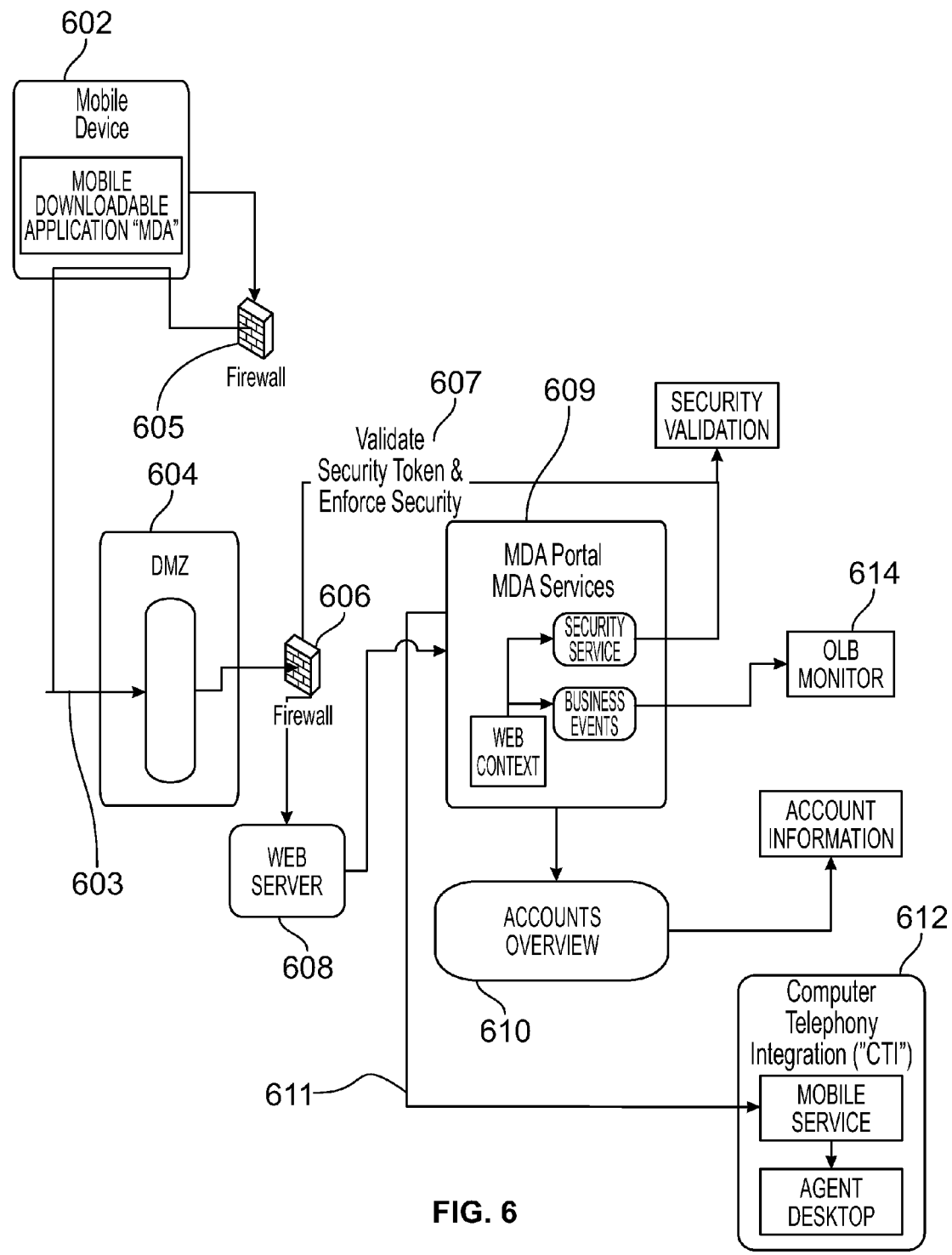
FIG. 6 shows additional apparatus in accordance with the invention.

FIG. 6 shows additional apparatus in accordance with the invention. FIG. 6 includes mobile device 602. Mobile device 602 supports an MDA in accordance with the invention. In FIG. 6, the MDA may be an online banking MDA. However, any suitable MDA, application, or webpage may use apparatus illustrated in FIG. 6.

Mobile device 602 may be in electronic communication with demilitarized zone ("DMZ") 604 via communications channel 603. Communications channel 603 may be routed through firewall 605. DMZ 604 may be in electronic communication with MDA Portal 609. DMZ 604 may communicate with MDA Portal 609 via web server 608 after a user validates his identity using validate security token and enforce security 607. DMZ 604 may route data to MDA portal 609 through firewall 606.

MDA Portal 609 may receive and transmit data from a plurality of databases. For example, MDA Portal 609 may receive and transmit data form accounts overview 610 and online banking ("OLB") monitor 614.

MDA Portal 609 may be in electronic communication with computer telephone integration ("CTI") 612. CTI 612 may be configured to receive metadata transmitted from MDA Portal 609 via secure communications link 611. Thus, data transmitted from MDA portal 609 to CTI 612 may be actualized in a highly secure network. This may assist in ensuring the secure transmission of customer data from the MDA portal 609 to CTI 612.

Figure 7:
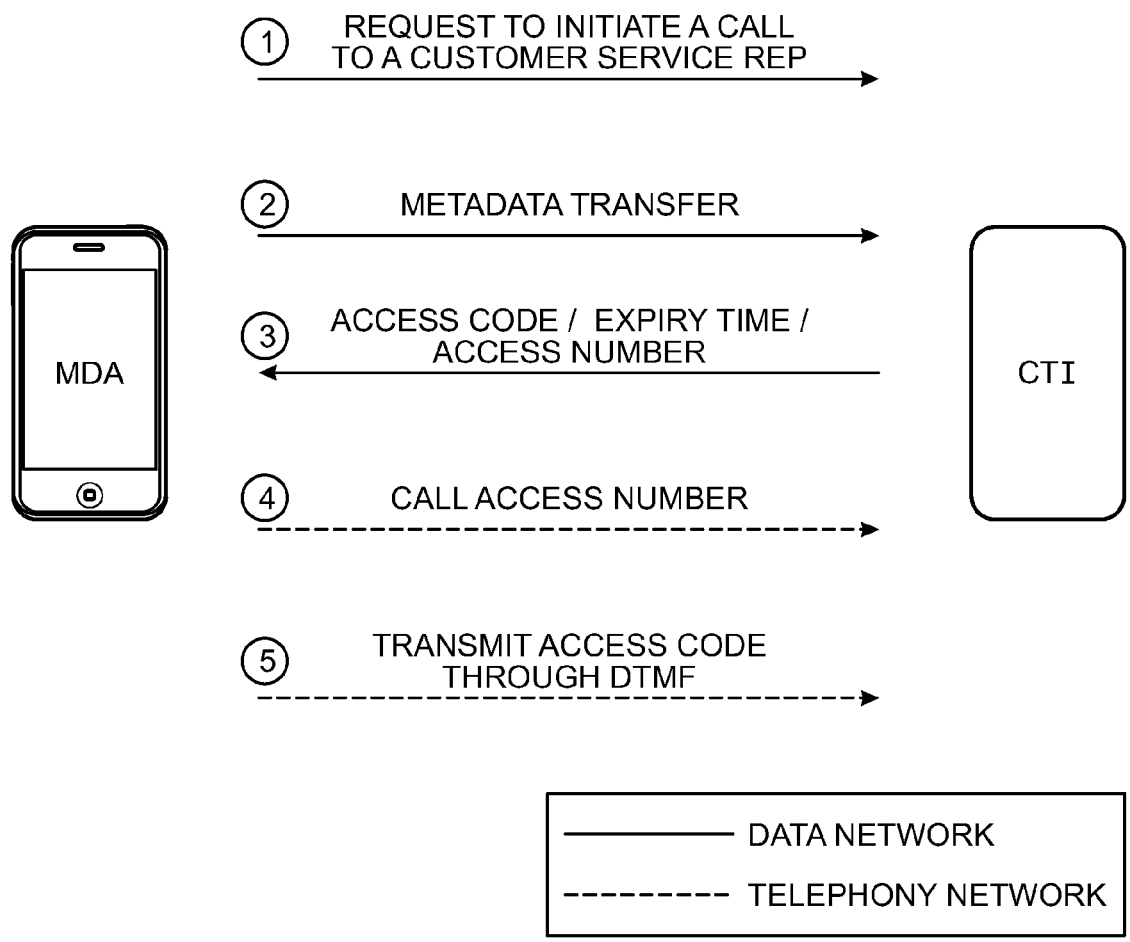
FIG. 7 shows a process in accordance with the invention.

FIG. 7 illustrates an exemplary process that may be used in accordance with the systems and methods of the invention. It should be noted that the exemplary process illustrated in FIG. 7 is for illustrative purposes only. Each of the steps included in FIG. 7 is optional, and may be deleted, modified, and/or generated in an order different from the order illustrated. Furthermore, one or more steps not illustrated in FIG. 7, but described herein, may be added to the process detailed in FIG. 7.

Additionally, it should be noted that each of the steps included in FIG. 7 may be executed by one or more receivers, transmitters, processors, and/or any other suitable hardware.

The illustrative process included in FIG. 7 may include one or more of steps 1-5. Step 1 may include an MDA in accordance with the invention transmitting to a CTI, a request to initiate a call to a customer service representative. Step 2 may include the MDA transmitting metadata to the CTI. In some embodiments, steps 1 and 2 may be executed substantially simultaneously. In other embodiments, step 1 may be executed before step 1, after step 1, or step 1 may not be executed at all.

Step 3 may include the CTI transmitting to the MDA one or more of an access code, expiry time and an access number. Step 4 may include the MDA calling the access number. Step 5 may include the MDA transmitting the access code to the CTI using DTMF. In some embodiments, steps 4 and 5 may be executed substantially simultaneously. In other embodiments, step 4 may be executed prior to step 5.

In steps 1-3, the MDA uses a data network to transmit and receive data from the CTI. In steps 4-5, the MDA uses a telephony network to communicate with the CTI. In some embodiments, the data network used by the MDA may be data network 507 illustrated in FIG. 5. In some embodiments, the telephony network used by the MDA may be telephony network 517 illustrated in FIG. 5.

However, these communication networks are for illustrative purposes only and are not limiting in any way. For example, in some embodiments, the MDA may use a data network such as the internet to communicate with the CTI in all of steps 1-5. Exemplary internet networks that may be used include WiFi, 3G, and 4G networks. In other embodiments, the MDA may communicate with the CTI in some or all of steps 1-5 using a telephony network or any other suitable network configured to transmit data.

In some embodiments, the MDA may automatically, or in response to user prompt(s), call the access number using an internet-based phone service such as Skype™, GoogleVoice™ or any other suitable service. In these embodiments, the MDA may use any suitable application for passing the access code over the network to the CTI.

Thus, systems and methods for providing call and data routing have been provided. Persons skilled in the art will appreciate that the present invention can be practiced by other than the described embodiments, which are presented for purposes of illustration rather than of limitation.

What is claimed is:

1. A mobile phone for initiating a phone call, the mobile phone comprising:
   a receiver configured to receive a request from a user to initiate a phone call, the request being input into a screen associated with a mobile application downloaded on the mobile phone, the request comprising a video of customer navigation in the mobile application for a predetermined time period to selecting to initiate the phone call; and
   in response to the receipt of the request to initiate the phone call, a transmitter configured to transmit user session-state metadata over a data communications network to a remote call center platform, wherein the mobile application is configured to:
      map one or more pieces of session-state metadata to an interactive voice response (IVR) system of tagged data; and
      generate one or more caller intent IVR tags for the metadata prior to transmission.

2. The mobile phone of claim 1 wherein the metadata includes the authentication status of the user in the mobile application.

3. The mobile phone of claim 1 wherein the metadata includes authentication data input by the user in the mobile phone application.

4. The mobile phone of claim 1 further comprising:
   using the receiver to receive an access number and an expiry time from the remote call center platform; and
   using the transmitter to transmit a request to a phone call dialer application to call the access number.

5. One or more non-transitory computer-readable media storing computer-executable instructions which, when executed by a processor on a computer system included in an agent desktop computer, perform a method for assisting an agent in conducting a phone call with a customer, the method comprising:
   using a receiver to receive customer authentication data and customer metadata transmitted to a computer telephony integration ("CTI") platform from a mobile application downloaded on a mobile phone, transmission of the customer metadata to the CTI causes the CTI to:
      transmit an access code and an expiry time for the access code to the mobile application;
      reserve the agent by opening a live session on the agent desktop computer, wherein an expiry of the reservation corresponds to the expiry time for the access code; and
      transmit a telephone number to the mobile application, the telephone number associated with the reserved agent; and
   using a processor to display, on a graphical user interface ("GUI") at least a portion of the customer authentication data and the customer metadata, wherein the customer metadata is displayed on the GUI substantially simultaneously with the transmission of the telephone call to a headset associated with the agent desktop computer; wherein:
   the customer metadata includes the identification of a screen or webpage viewed by the customer prior to selecting to initiate the phone call; and wherein the received customer metadata comprises a video of customer navigation in the mobile application for a predetermined time period to selecting to initiate the phone call.

6. The media of claim 5 wherein the received customer metadata has been mapped to caller intent interactive voice response (IVR) tags and the processor is configured to display the caller intent IVR tags to the agent on the GUI.

\* \* \* \* \*